United States Patent [19]

Bremer et al.

[11] 4,386,195

[45] May 31, 1983

[54] DYESTUFF PREPARATIONS, PROCESSES FOR THEIR PRODUCTION AND THEIR USE FOR DYEING PLASTICS

[75] Inventors: Fritz Bremer, Leverkusen; Michael Kressner, Leichlingen; Karlheinz Wolf; Konrad Nonn, both of Leverkusen; Reinhold Hörnle, Cologne; Georg Pape, Leverkusen, all of Fed. Rep. of Germany

[73] Assignee: Bayer Aktiengesellschaft, Leverkusen, Fed. Rep. of Germany

[21] Appl. No.: 239,819

[22] Filed: Mar. 2, 1981

Related U.S. Application Data

[63] Continuation of Ser. No. 117,136, Jan. 30, 1980, abandoned.

[30] Foreign Application Priority Data

Feb. 16, 1979 [DE] Fed. Rep. of Germany ....... 2905975

[51] Int. Cl.$^3$ .................... C08K 5/23; C08G 18/32; C08K 5/43
[52] U.S. Cl. .................... 528/73; 528/75; 528/85; 528/53; 528/55; 524/715; 524/871; 8/552; 8/557; 521/53; 521/157; 521/166
[58] Field of Search ................ 260/37 N; 528/73, 75, 528/85, 45, 49; 524/715, 783, 784, 787, 871; 521/157, 166, 167

[56] References Cited

U.S. PATENT DOCUMENTS

| | | | |
|---|---|---|---|
| 3,823,167 | 7/1974 | Peters et al. | 260/37 N |
| 3,993,619 | 11/1976 | Kruckenberg et al. | 260/37 N |
| 4,026,931 | 5/1977 | Wiesel et al. | 260/37 N |
| 4,038,240 | 7/1977 | Hugl et al. | 260/37 N |
| 4,075,152 | 2/1978 | Taller | 260/37 N |
| 4,101,274 | 7/1978 | Beutler et al. | 8/552 |
| 4,148,779 | 4/1979 | Blackwell et al. | 8/552 |
| 4,167,395 | 9/1979 | Engelhardt et al. | 8/552 |
| 4,168,145 | 9/1979 | Hintermcier et al. | 8/552 |

*Primary Examiner*—Maria Parrish Tungol
*Attorney, Agent, or Firm*—Sprung, Horn, Kramer & Woods

[57] ABSTRACT

Dyestuff preparations which are capable of flow and contain (a) at least one dyestuff which is sparingly soluble or insoluble in water, (b) at least one polyester of phthalic acid and a polyalcohol and optionally a monohydric alcohol with 1–18 C atoms and (c) optionally further auxiliaries, and their use for dyeing plastics, in particular polyurethane plastics.

9 Claims, No Drawings

DYESTUFF PREPARATIONS, PROCESSES FOR THEIR PRODUCTION AND THEIR USE FOR DYEING PLASTICS

This is a continuation of application Ser. No. 117,136, filed Jan. 30, 1980, now abandoned.

The invention relates to preparations, which are capable of flow, of dyestuffs which are sparingly soluble or insoluble in water, processes for their production and their use for dyeing plastics, in particular polyurethane plastics.

The preparations contain (a) at least one dyestuff which is sparingly soluble or insoluble in water, (b) at least one polyester of phthalic acid and a polyol and optionally a monohydric alcohol with 1–8 C atoms and (c) optionally further auxiliaries.

The preparations are preferably in the form of concentrated dyestuff dispersions which are composed of 5–70% by weight of at least one dyestuff which is sparingly soluble or insoluble in water, particularly preferably 10–60% by weight, 30–95% by weight of polyester, particularly preferably 40–90% by weight, and 0–10% by weight of further auxiliaries which are customary for pigment dispersions. The viscosity of the preparations which are capable of flow is preferably between about 3,000 and about 8,000 m Poise at room temperature.

Suitable dyestuffs which are sparingly soluble or insoluble in water are preferably pigments and dyestuffs which, because of their structure, are suitable for incorporation into a polyurethane chain (polyurethane incorporation dyestuffs), such as dyestuffs which contain amino groups or hydroxyl groups and which can belong to the most diverse classes of dyestuffs, for example the triphenylmethane series, oxazine series, thiazine series, methine series or phthalocyanine series, but in particular the azo series or anthraquinone series.

The dyestuffs mentioned possess amino groups or hydroxyl groups which can react with the starting components, in particular the isocyanates, before, during or after production of the polyurethane.

The reactive amino group can be a primary or secondary amino group. Primary amino groups are preferred; these can be directly on an aromatic nucleus of the dyestuff molecule or can be linked to the dyestuff molecule via an alkylene bridge. The alkylene bridge can in turn be bonded directly to the dyestuff radical or via —CO—, —CO$_2$—, —SO$_2$—, —CONH—, —NH— or —SO$_2$NH—.

The reactive hydroxyl group is preferably in a hydroxyalkyl radical. This can be bonded directly to an aromatic nucleus, for example as a hydroxymethyl radical, or via a bridge atom, for example an oxygen, sulphur or nitrogen bridge, as, for example, in the groups —O—CH$_2$—CH$_2$—OH, —S—CH$_2$—CH$_2$—OH,

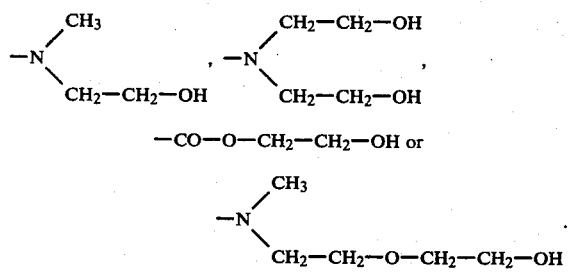

Suitable dyestuffs from the various series of dyestuffs are known from DE-AS (German Published Specification) 1,114,317.

Suitable pigments are preferably organic pigments, for example those of the azo series, anthraquinone series, azaporphine series, thioindogo series or polycyclic series, and furthermore those of the quinacridone series, dioxazine series, naphthalenetetracarboxylic acid series or perylenetetracarboxylic acid series, as well as dyestuff lakes, such as Ca, Mg or Al lakes of dyestuffs containing sulphonic acid groups and/or carboxylic acid groups, of which a large number are known, for example from the Colour Index, 2nd Edition. In addition, inorganic pigments may be mentioned, such as zinc sulphides, cadmium sulphides/selenides, ultramarine, titanium dioxides, iron oxides, nickel titanium yellow or chromium titanium yellow, cobalt blue, chromium oxides and chromate pigments, as well as carbon black.

The polyesters used according to the invention preferably have molecular weights between 300 and 800 g mol$^{-1}$, preferably between 400 and 600 g mol$^{-1}$, and a viscosity of 1500–3000 m Poise, preferably 1800–2800 m Poise, at room temperature. They are obtained in a known manner by reacting phthalic acid with polyalcohols, optionally mixed with monohydric alcohols with 1–18 C atoms.

Examples of polyalcohols which can be employed are glycol, diethylene glycol, butane-1,4-diol, butene-1,4-diol, butine-1,4-diol, hexane-1,6-diol, octane-1,8-diol, trimethylolpropane, glycerol, pentaerythritol, sorbitol, sucrose or, preferably, triethylene glycol.

Examples of monohydric alcohols with 1–18 C atoms which may be mentioned are: methanol, ethanol, n-propanol, i-propanol, allyl alcohol, crotyl alcohol, n-butanol, i-butanol, sec.-butanol, t-butanol, n-amyl alcohol, neopentyl alcohol, n-hexyl alcohol, n-octyl alcohol, capryl alcohol, n-decyl alcohol, lauryl alcohol and myristyl alcohol.

Polyesters which have been obtained by condensation of phthalic acid, triethylene glycol and nonyl alcohol or i-nonyl alcohol are very particularly preferably employed in the preparations according to the invention.

Examples which may be mentioned of further auxiliaries which can optionally be present in the dyestuff preparations are: anionic, cationic and non-ionic surface-active agents, high-molecular silicic acids, in particular montmorillonites, which can also contain organic ammonium salts, and plasticisers known from plastics technology, such as esters of phthalic acid or phosphoric acid with monohydric alcohols.

The dyestuff dispersions are produced in customary wet comminution units, such as attrition mills, roll mills, dissolvers, rotor-stator mills, corundum disc mills or ball mills, and particularly advantageously in high-speed stirred mills.

The dyestuff dispersions are particularly suitable for colouring polyurethane plastics. For this, either the dyestuff dispersions are mixed with the polyalcohols before producing the polyurethane and the polyurethane plastic is then produced by known processes by reaction with polyisocyanates, or the dyestuff dispersions are metered into the reaction components during production of the polyurethane.

The dyestuff dispersions are particularly suitable for dyeing polyurethane foams which should have a uniform pore structure and depth of colour.

EXAMPLE 1

A black dyestuff preparation of 18 g of carbon black colourant, 10 g of tri-N-butyl phosphate and 72 g of a polyester which is a reaction product of phthalic acid, triethylene glycol and isononyl alcohol and has a OH number of 300–320 is produced as follows:

The carbon black, tri-N-butyl phosphate and polyester are introduced, via metering screws, into a high-speed, continuously operating stirred mill charged with steel beads. A colour paste which is capable of flow and suitable for colouring polyurethane foam is obtained. The molecular weight of the polyester used in Example 1 is in the range from 400 to 600 g-mol$^{-1}$; its viscosity is 2000–2500 m Poise at 20° C.

EXAMPLE 2

18 g of Pigment Yellow 17, 9 g of tri-N-butyl phosphate and 73 g of the polyester described in Example 1 are homogenised and the mixture is ground in a continuously operating stirred mill. A colour paste which is of high tinctorial strength and is capable of flow is obtained.

EXAMPLE 3

15 g of an azo dyestuff obtained from 5-amino-3 phenyl-1,2,4-thiadiazole and N,N-dihydroxyethyl-m-toluidine, 9 g of tri-N-butyl phosphate and 76 g of the polyester described in Example 1 are homogenised and the mixture is ground in a continuously operating stirred mill. A colour paste which is capable of flow is obtained.

EXAMPLE 4

90 g of a linear polyester-polyol with a OH number of 56 and a viscosity of 600 m Poise at 75° C. are mixed with 15 parts of a crosslinking agent, which essentially consists of water, butanediol and an activator, and 2.5 g of the black paste described in Example 1, and the mixture is foamed, to give a moulding, with the stoichiometric amount of an isocyanate prepolymer which has been prepared from a polyester and 4,4'-diisocyanatodiphenylmethane and has a NCO content of 19% by weight. This coloured moulding of semi-rigid polyurethane structural foam with an overall density of 0.6 g cm$^{-3}$ can be released from the mould after a mould dwell time of 5 minutes.

EXAMPLE 5

78 g of a polyether with a OH number of 35 and a viscosity of 825 c Poise at 25° C., 10 g of the carbon black paste described in Example 1, a mixture of 6 g of butane-1,4-diol, 3 g of ethylene glycol and 2 g of trimethylolpropane, as a crosslinking agent, 0.45 g of triethylenediamine, as a catalyst, and a mixture of 0.2 g of water, 8 g of trichloromonofluoromethane and 4 g of methylene chloride, as a blowing agent, are mixed thoroughly and the mixture is introduced into a metering-mixing unit. A modified diphenylmethane 4,4'-diisocyanate is introduced into the metering apparatus as the second component. Both components are mixed intensively and introduced into a prepared foaming mould in which a polyurethane structural foam moulding is then formed; the moulding can be released from the mould after about 5 minutes. The moulding thus produced has an overall density of 0.3 g/cm$^3$ and does not differ from a non-coloured moulding with respect to its mechanical properties (for example elongation at break, tensile strength, compressive strength and permanent set).

EXAMPLE 6

100 g of a polyol mixture which has a OH number of 495 and a viscosity of 1150 cP at 25° C. and consists of 80 g of a polyether, which has a OH number of 550 and has been obtained by adding ethylene oxide onto trimethylolpropane, and 20 g of a polyester which has a OH number of 370 and has been obtained by reaction of 1 mol of adipic acid, 2.6 mols of phthalic anhydride, 1.3 mols of oleic acid and 6.9 mols of trimethylolpropane, are mixed with 1 g of a polysiloxane/polyalkylene oxide block copolymer, as a foam stabiliser, 0.5 g of tetramethylguanidine, as a catalyst, 5 g of monofluorotrichloromethane, as a blowing agent, and 5 g of a dyestuff preparation described in Example 1, 2 or 3. The mixture is passed to a two-component metering-mixing apparatus and in this apparatus is mixed intensively with 155 g of a polyisocyanate, which has been obtained by phosgenation of aniline/formaldehyde condensates and subsequent reaction of the phosgenation product with a diol with a OH number of 480, and which has a viscosity of 130 cP at 25° C. and a NCO content of 28% by weight, to produce the foaming reaction mixture, and the mixture is immediately introduced into a metal mould heated to 60° C. After a mould dwell time of 7 minutes, the coloured moulding of rigid polyurethane structural foam with an overall density of 0.6 g/cm$^3$ can be released from the mould. Compared with a non-coloured crude moulding, the mechanical properties (ε modulus, flexural strength, elongation of break, impact strength, heat distortion point and the like) of the coloured moulding are not impaired.

We claim:

1. In a process for coloring a polyurethane in which a dyestuff dispersion is mixed with a polyalcohol before producing the polyurethane and the polyurethane plastic is then produced by a known process by reaction with a polyisocyanate or the dyestuff dispersion is metered into the reaction components during production of the polyurethane, the improvement which comprises employing as the dyestuff dispersion a sparingly soluble or water insoluble dyestuff and at least one polyester of phthalic acid with triethylene glycol and nonyl or isononyl alcohol.

2. A process according to claim 1, wherein said composition contains an auxiliary.

3. A process according to claim 1, wherein said polyester has a molecular weight of 300–800 g mol$^{-1}$.

4. A process according to claim 1, wherein said composition consists essentially of 5–70% by weight of at least one dyestuff which is sparingly soluble or insoluble in water, 30 to 95% by weight of said polyester and 0–10% of an auxiliary.

5. A process according to claim 1, wherein said polyester has a viscosity between 1500 and 3000 m Poise.

6. A process according to claim 1, wherein said composition contains a pigment.

7. A process according to claim 1, wherein said polyester has a molecular weight between 300–800 g mol$^{-1}$ and a viscosity of between 1500 and 3000 m Poise.

8. A process according to claim 1, wherein said dyestuff and polyester are formed into a paste.

9. A process according to claim 1, wherein said dyestuff and polyester are formed into a paste and said paste is included in a polyurethane-forming composition.

* * * * *